March 21, 1950 D. C. MARQUEZ 2,501,572
SKILLET AND KETTLE COMBINATION
Filed Sept. 30, 1947 2 Sheets-Sheet 1

INVENTOR
DANNY C. MARQUEZ
BY Cook and Schermerhorn
ATTORNEYS

March 21, 1950  D. C. MARQUEZ  2,501,572
SKILLET AND KETTLE COMBINATION
Filed Sept. 30, 1947  2 Sheets-Sheet 2
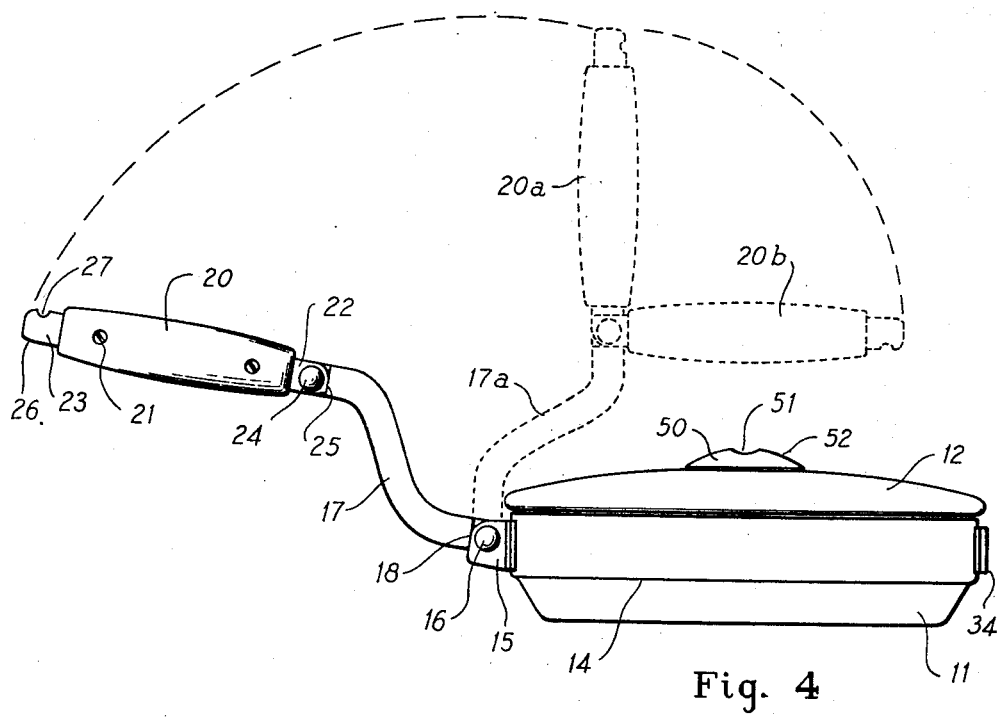
Fig. 4
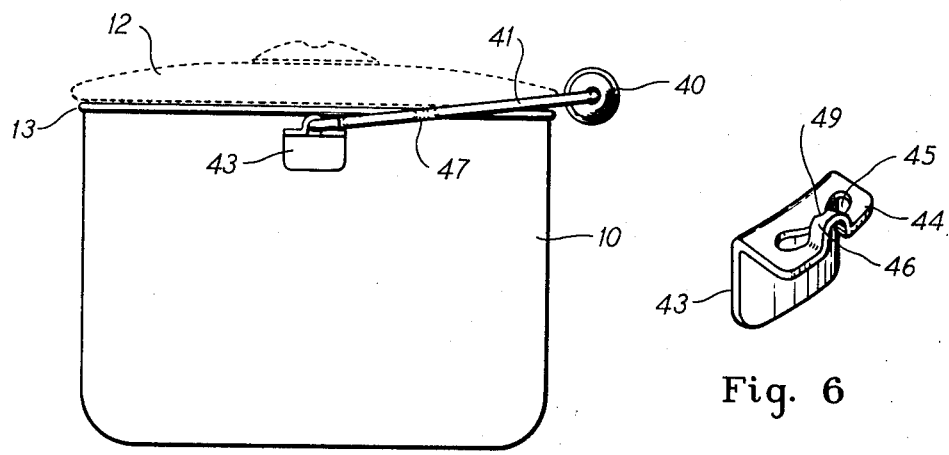
Fig. 3
Fig. 6
INVENTOR
DANNY C. MARQUEZ
BY Cook and Schermerhorn
ATTORNEYS Patented Mar. 21, 1950

2,501,572

UNITED STATES PATENT OFFICE 2,501,572

SKILLET AND KETTLE COMBINATION

Danny C. Marquez, Portland, Oreg.

Application September 30, 1947, Serial No. 776,889

6 Claims. (Cl. 220—20)

This invention relates to novel skillet and kettle structures adapted for mutual cooperation and interengagement so that the combination may be carried by a single handle on one of the structures.

Objects of the invention are to provide a novel skillet and kettle combination which may be clamped together and carried as a single unit, to provide a combination of the type described having a novel multi-purpose handle on at least one of the structures, to provide a combination of the type described in which the skillet has a handle adapted to serve as a carrying handle for the combination, to provide a skillet and kettle combination in which the handle of the kettle is adapted to clamp the skillet to the kettle so that the combination may be carried by the skillet handle, to provide a dual purpose skillet handle of novel jointed construction, and to provide a kettle with a novel bail which is adjustable to different positions to serve either as a carrying handle for the kettle alone or as a clamp to secure the skillet to the kettle.

The invention comprises in its preferred embodiment a kettle having a bail adapted in one position to serve as a carrying handle for the kettle, and a skillet designed to fit in the top of the kettle in the manner of a double boiler which may be covered by a lid on the skillet. The skillet is provided with a jointed handle which may be swung to one position to form a handle for the use of the skillet individually in cooking or other operations. When folded into another position, the skillet handle is adapted to engage with a removable hanger link on the opposite side of the skillet to form a bail support for the skillet wherein the grip on the handle is disposed centrally above the skillet. The bail on the kettle may be adjusted to a shortened position to engage over the cover on the skillet to clamp the skillet on top of the kettle, whereby the skillet handle may then be utilized to carry the combination as a single unit. The combination thus assembled and arranged may be used to carry other utensils such as small plates, knives, forks and the like, or the combination may be carried in the manner described with food in either or both of the two containers. With either mode of operation the present arrangement is especially useful in connection with outdoor cooking where it may be necessary to carry utensils and/or food for some distance.

The invention further resides in the details of construction and arrangement of the parts, and additional objects and advantages of the invention will become apparent from the following description in connection with the accompanying drawings illustrating a preferred embodiment of the invention. It is to be understood, however, that various changes may be made in the construction and arrangement of parts and all such modifications within the scope of the appended claims are included in the invention.

In the drawings:

Figure 3 is a view of the kettle alone;

Figure 4 is a view of the skillet showing different positions of the jointed handle;

Figure 5 is a top plan view of the hand grip on the skillet handle;

Figure 6 is a perspective view of one of the carrying lugs on the kettle;

Figure 1:
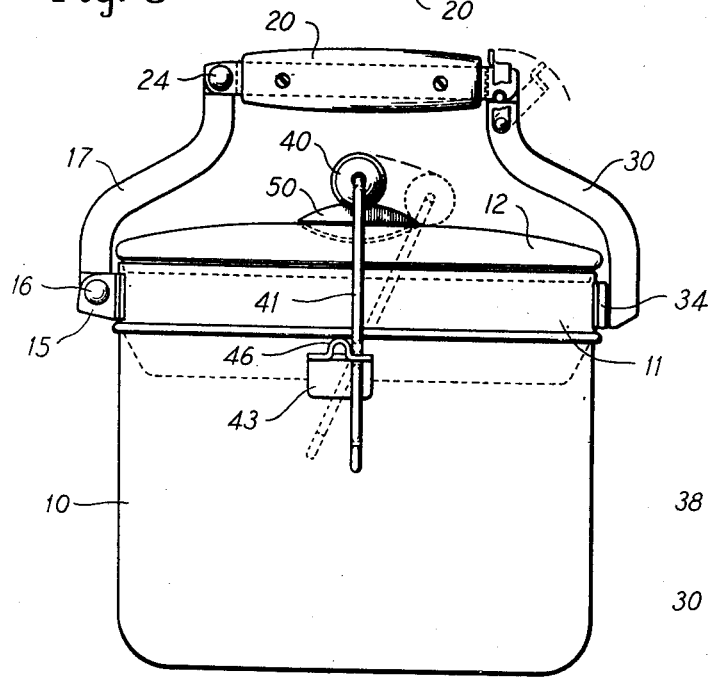
Figure 1 is a side elevation view of the skillet and kettle combination.
Figure 7:
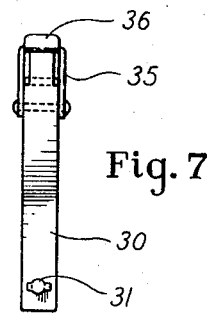
Figure 7 is an elevation view of the inner side of the hanger link for the skillet handle, taken at right angles to the view in Figure 1.
Figure 2:
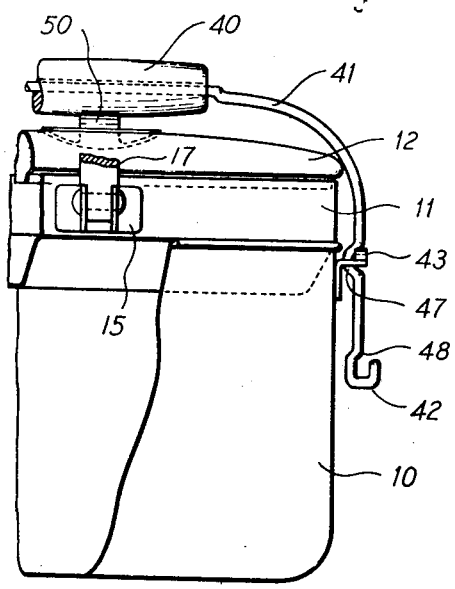
Figure 2 is a fragmentary side elevation view of the skillet and kettle combination taken at right angles to the view in Figure 1.

The skillet and kettle combination shown in Figures 1 and 2 comprises a kettle 10, a skillet 11, and cover 12 which is adapted to fit either the skillet or the kettle. The kettle 10 is preferably provided with a rolled bead 13 on its upper edge to support a shoulder 14 on the skillet 11, whereby the skillet may be nested partially within the kettle to combine the two utensils in the manner of a double boiler. The shoulder 14 is preferably at an intermediate height between the top and bottom of the skillet so that the lower portion of the skillet below this shoulder extends down into the kettle and an upper portion above this shoulder extends above the top edge of the kettle.

A bracket 15 having a rivet 16 or other pivotal support for an S-shaped handle stem 17 is mounted on one side of the skillet above the shoulder 14. The end of the stem 17 on the rivet 16 is received between two outstanding ears of the bracket 15 and has shoulders 18 on its opposite sides to engage the ends of the ears of the bracket as abutments to limit the downward movement of the stem on its pivot. A handle grip 20 is similarly pivotally mounted on the other end of the stem 17. The grip 20 comprises a pair of members of heat insulating and heat resistant material secured by bolts or rivets 21 to the opposite sides of a pair of metallic members having offset end portions 22 and 23 as shown in Figure 5. The end portion 22 is pivotally mounted on a rivet or pin 24 extending through the end of the stem 17. The extremity of the end portion 22 engages shoulders 25 on the stem 17 to limit the downward movement of the grip 20 when the latter is extended outwardly from the skillet. The end portion 23 has sloping surfaces 26 on one side and notches 27 on the other side. By reason of the shoulders 18 and 25 on the stem 17 the grip 20 is disposed in an elevated position at a slight angle to horizontal when the handle is opened out to its limit of movement, as shown in full lines in Figure 4 for lifting the skillet.

Figure 9:
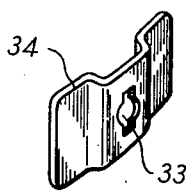
Figure 9 is a perspective view of the lug on the skillet for engaging the lower end of the hanger link.
Figure 10:
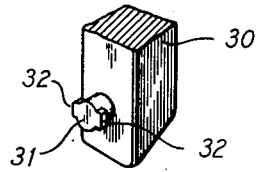
Figure 10 is a perspective view of the lower end of the hanger link.

The handle grip 20 and stem 17 may be swung on a pivot 16 until the shoulder 18 engages the top surface of the ears of the bracket 15 with the parts occupying the positions designated at 20a and 17a and then the handle grip may be further rotated on its pivot 24 to a horizontal position as indicated at 20b with the sides of the end portion 22 then engaging the shoulders 25. The handle grip is thereby disposed over the center of the skillet in a position to receive an S-shaped hanger link 30 to form a rigid bail for the skillet as shown in Figure 1. The lower end of the hanger link 30 is provided with a stud 31 having oppositely directed lateral projections 32, shown in Figure 10, to engage in a double keyhole slot 33 in a lug 34, shown in Figure 9, which is mounted on the side of the skillet opposite the bracket 15. The elongated parts of the double keyhole slot 33 are disposed vertically in the lug 34 to require the hanger link 30 to be turned to a horizontal position before the projections 32 can be entered into the keyhole slot. Then when the hanger link 30 is turned to an upright position the projections 32 cause the stud 31 to become locked to the lug 34 on the skillet.

Figure 8:
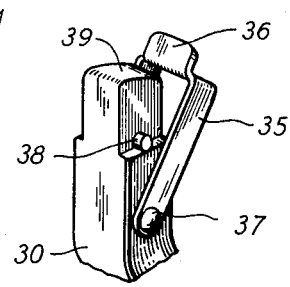
Figure 8 is a perspective view of the handle locking device on the upper end of the hanger link shown in Figure 7.

The upper end of the hanger link 30 is provided with a latch in the form of an inverted stirrup 35 having an upwardly projecting thumb piece 36, which stirrup is pivotally mounted on a rivet or pin 37 to swing through an arc as shown in Figures 1 and 8. The upper extremity of the hanger link 30 within the stirrup 35 is reduced in thickness to be received between the spaced parts of the end portion 23 of the handle and is provided with a pin 38 to engage in the notches 27. This end portion of the hanger link 30 is provided with a sloping surface 39 corresponding to the contour of the sloping sides 26 of the end portions 23 of the handle to bind and frictionally retain the stirrup catch 35 when it is swung up to a clamping position as shown in full lines in Figure 1. When the stirrup 35 is swung out to its broken line position the handle grip 20 may be swung upwardly on its pivot 24 to disengage the hanger link 30.

The kettle 10 may be carried individually by a handle 40 on a bail 41. The lower end of the bail 41 has hooks 42 formed therein to engage carrying lugs 43 attached to the kettle. Each lug 43 has a horizontal flange 44 containing an arcuate slot 45 as shown in Figure 6. The outer strip of metal in the flange 44 between the central part of the slot 45 and the edge of the flange is deformed upwardly to form an arch 46. On the inside edge of the arch 46 is a shallow circular notch 49. Each leg of the bail 41 is disposed in one of the slots 45 and an intermediate portion of each leg of the bail is deformed into an offset portion 47 which forms a detent for securing the bail in a lower position to clamp the cover 12 and skillet 11 on top of the kettle. To accomplish this function the cover 12 is preferably provided with a central rigid handle piece 50 set in a depression in the cover and having a central recess or saddle 51 to hold the handle 40 in the clamping position shown in full lines in Figure 1. On each side of the saddle 51 are sloping ramp surfaces 52, up which the handle 40 may be moved as a roller to enter into the saddle from either side.

The handle arrangement just described is such that when the bail 41 is raised each hook end 42 will enter into one of the arches 46 to allow the bail to lay over to one side to clear the rim of the kettle as shown in Figure 3. The height of the arch 46 is preferably just sufficient to hold the bail in an approximately horizontal position with a portion of the bail adjacent the hook 42 resting on the top surface of the flange 44. The bail 41 has sufficient spring in outward directions so that when the bail is raised and released in a vertical position it will not slide downward. The slightly offset portion 48 of the bail near the opening of the hook 42 rests against the notch 49 of the arch 46 confining the hook 42 within the inside walls of the arch 46, thus holding the bail in vertical position.

To use the bail 41 as a clamp for the skillet 11 and cover 12, as shown in Figures 1 and 2, the bail is first raised to an inclined position at about a 45° angle and then pushed down through the slots 45 until the offset portions 47 engage the arches 46. Then by tilting the bail up nearly vertical and moving each leg to one end of its slot 45 the offset portion or detent 47 is engaged in the slot to hold the bail in its lowermost clamping position. In being moved to this position, the two ends of the bail are preferably moved in opposite directions from the respective arches 46 to leave the bail disposed diametrically across the kettle. When the skillet 11 and cover 12 are in place the bail will occupy the broken line position shown in Figure 1 as the offset portions 47 are engaged in the ends of the respective slots 45. The bail is preferably of such length that when it is in the broken line position just referred to the handle 40 contacts the top of the cover 12 so that upon rolling the handle up the ramp surface 52 to enter the saddle 51 the bail is slightly sprung to securely clamp the parts together as shown in both of Figures 1 and 2. It will be observed that in the vertical, clamped position of the bail the offset portion 47 cannot enter under the arch 46 to release or relax the clamping action, but will be retained in engagement with the horizontal part of the flange 44 at one side of the arch 46, as shown in full lines.

The clamping action thus exerted by the bail 41 holds the skillet 11 on top of the kettle 10 permitting the combination to be carried by the handle 20 of the skillet as shown in Figure 1. When the various parts are thus assembled and clamped together, there results a relatively rigid structure wherein neither one of the handles is free for casual movement but wherein the various parts may readily be separated for access to the contents of the skillet or kettle, or for the separate or combined use of these utensils. Other substantially equivalent nesting and clamping arrangements may be devised by persons skilled in the art to accomplish the broad objects of the invention, the present embodiment being intended merely to illustrate and not to limit the invention.

Having now described my invention and in what manner the same may be used, what I claim as new and desire to protect by Letters Patent is:

1. A skillet and kettle combination comprising a kettle, a bail for said kettle, a pair of bail lugs on said kettle adapted to secure said bail in raised and lowered positions, a skillet adapted to nest in the top of said kettle, a cover for said skillet, said lugs engaging said bail in its raised positions as a swinging bail to carry said kettle alone and engaging said bail in its lowered position to tension the bail against the cover on said skillet to clamp said skillet in said nested position in said kettle, and a handle on said skillet movable to one position for using the skillet alone and movable to another position for carrying said skillet and kettle combination.

2. A skillet and kettle combination comprising a kettle, a bail for said kettle, a pair of bail lugs on said kettle for securing said bail in upper and lower positions, a skillet adapted to nest in the top of said kettle, a cover on said skillet, said bail being arranged to function as a swinging bail for said kettle in said upper position and being adapted to engage and lock in said lugs in said lower position to clamp said skillet in said nested position.

3. A skillet and kettle combination comprising a kettle, a skillet adapted to nest in the top of said kettle, a cover for said skillet, a handle on said cover having a recess, a bail for said kettle, and bail lugs on said kettle for securing said bail in a short position to engage said bail in said recess in said handle to clamp together said kettle, skillet and cover, said bail being extendible through said bail lugs to serve also as a swinging bail to carry the kettle.

4. A skillet and kettle combination comprising a kettle, a skillet adapted to nest in the top of said kettle, a cover on said skillet, a handle on said cover having a central recess and sloping ramp surfaces on opposite sides of said recess, a bail for said kettle, a roller handle on said bail, and bail lugs on said kettle to secure said bail in a position to move said roller handle across one of said ramp surfaces and enter said recess with said bail under tension to clamp all of said parts together, said bail being extendible through said bail lugs to serve also as a swinging bail to carry the kettle.

5. In a skillet, a handle stem pivotally mounted on one side of the skillet, stop means in said pivotal mounting to limit the pivotal movement of said stem to approximately 90 degrees, a handle grip pivotally mounted on said stem, stop means in said second pivotal mounting to limit the pivotal movement of said grip on said stem to approximately 90 degrees, said grip being limited to approximately 180 degrees of pivotal movement with respect to said skillet through the joint action of both of said pivotal mountings, said grip extending away from the skillet in one limit position with said stop means being effective to hold the skillet approximately parallel with said grip when carried by the grip, said grip extending over the center of the skillet and parallel therewith in its opposite limit position, and means to secure said grip in said center position for carrying the skillet.

6. In a skillet, a handle stem pivotally mounted on one side of the skillet, stop means in said pivotal mounting to limit the movement of said stem, a handle grip pivotally mounted at one end of said stem, stop means in said last pivotal mounting to limit the movement of said grip, said stop means cooperating to support the skillet from the handle in approximately parallel relation with the handle extended away from the skillet, and a detachable hanger link symmetrical with said stem for connecting the free end of said grip with the other side of the skillet to secure said grip over the center of the skillet and parallel therewith.

DANNY C. MARQUEZ.

REFERENCES CITED

The following references are of record in the file of this patent:

UNITED STATES PATENTS

| Number | Name | Date |
| --- | --- | --- |
| 42,547 | Avery | May 3, 1864 |
| 291,680 | Carbaugh | Jan. 8, 1884 |
| 643,492 | Fromholz | Feb. 13, 1900 |
| 823,415 | Krampitz | June 12, 1906 |
| 912,095 | Eason | Feb. 9, 1909 |
| 1,586,020 | Witherspoon | May 25, 1926 |
| 2,273,959 | Holzer | Feb. 24, 1942 |

FOREIGN PATENTS

| Number | Country | Date |
| --- | --- | --- |
| 811,296 | France | Jan. 14, 1937 |